(12) United States Patent
Vuk

(10) Patent No.: US 8,522,757 B2
(45) Date of Patent: *Sep. 3, 2013

(54) METERING EXHAUST GAS RECIRCULATION SYSTEM FOR A DUAL TURBOCHARGED ENGINE HAVING A TURBOGENERATOR SYSTEM

(75) Inventor: Carl T. Vuk, Denver, IA (US)

(73) Assignee: Deere & Company, Moline, IL (US)

( * ) Notice: Subject to any disclaimer, the term of this patent is extended or adjusted under 35 U.S.C. 154(b) by 980 days.

This patent is subject to a terminal disclaimer.

(21) Appl. No.: 12/607,401

(22) Filed: Oct. 28, 2009

(65) Prior Publication Data

US 2011/0094486 A1   Apr. 28, 2011

(51) Int. Cl.
F02B 47/08 (2006.01)
F02M 25/07 (2006.01)
F02M 25/06 (2006.01)
B60T 7/12 (2006.01)
B05D 1/00 (2006.01)
G06F 7/00 (2006.01)
G06F 17/00 (2006.01)

(52) U.S. Cl.
USPC .................. 123/568.12; 60/278; 701/108

(58) Field of Classification Search
USPC ........... 60/597, 605.2, 612; 123/562, 568.11, 123/568.12, 568.21; 701/108
See application file for complete search history.

(56) References Cited

U.S. PATENT DOCUMENTS

| | | | |
|---|---|---|---|
| 4,622,817 A | 11/1986 | Kobayashi | |
| 4,955,199 A * | 9/1990 | Kawamura | 60/608 |
| 5,611,204 A | 3/1997 | Radovanovic et al. | |
| 5,771,868 A | 6/1998 | Khair | |
| 5,791,146 A | 8/1998 | Dungner | |
| 5,937,650 A | 8/1999 | Arnold | |
| 6,041,602 A | 3/2000 | Dickey | |
| 6,050,095 A | 4/2000 | Blake | |
| 6,112,523 A * | 9/2000 | Kamo et al. | 60/612 |
| 6,138,649 A | 10/2000 | Khair et al. | |
| 6,164,071 A | 12/2000 | Shao et al. | |
| 6,205,785 B1 | 3/2001 | Coleman | |
| 6,218,461 B1 | 4/2001 | Shao et al. | |
| 6,301,888 B1 | 10/2001 | Gray, Jr. | |
| 6,324,846 B1 * | 12/2001 | Clarke | 60/605.2 |
| 6,558,173 B1 | 5/2003 | Kolmanovsky et al. | |
| 6,889,503 B2 | 5/2005 | Hoecker et al. | |
| 6,945,236 B2 | 9/2005 | Nakai et al. | |
| 6,955,162 B2 | 10/2005 | Larson et al. | |
| 7,047,743 B1 | 5/2006 | Stahlhut et al. | |
| 7,336,000 B2 | 2/2008 | Stahlhut et al. | |
| 7,383,684 B2 | 6/2008 | Vuk | |
| 7,471,008 B2 | 12/2008 | Stahlhut et al. | |

(Continued)

Primary Examiner — Stephen K Cronin
Assistant Examiner — Sizo Vilakazi

(57) ABSTRACT

An internal combustion engine having an engine block for internal combustion, a high-pressure (HP) turbocharger for delivering pressurized intake air to the engine block, a low-pressure (LP) turbocharger for delivering pressurized intake air to the HP turbocharger, a turbogenerator for recovering heat energy from the exhaust gas downstream of the LP turbocharger to generate electricity, and an exhaust gas recirculation (EGR) system comprising an EGR-pump drawing exhaust gas from an EGR inlet located downstream of the turbogenerator, wherein the EGR-pump controllably delivers exhaust gas to an EGR mixer in the pressurized intake air stream at a location between the LP turbocharger and HP turbocharger. An electronic control unit (ECU) is adapted to command the EGR-pump to deliver a desired EGR flow-rate to the engine block based on look-up tables and either open-loop and/or closed-loop control algorithms.

11 Claims, 1 Drawing Sheet

(56) References Cited

U.S. PATENT DOCUMENTS

| | | |
|---|---|---|
| 7,541,637 B2 | 6/2009 | Stahlhut et al. |
| 7,640,745 B2 * | 1/2010 | Japikse ................. 60/605.1 |
| 2006/0162335 A1 | 7/2006 | Vuk |
| 2009/0045629 A1 | 2/2009 | Vuk |
| 2009/0107123 A1 | 4/2009 | Vuk |
| 2011/0094224 A1 * | 4/2011 | Sheidler et al. ............. 60/605.2 |
| 2011/0094486 A1 * | 4/2011 | Vuk ..................... 123/568.21 |

\* cited by examiner

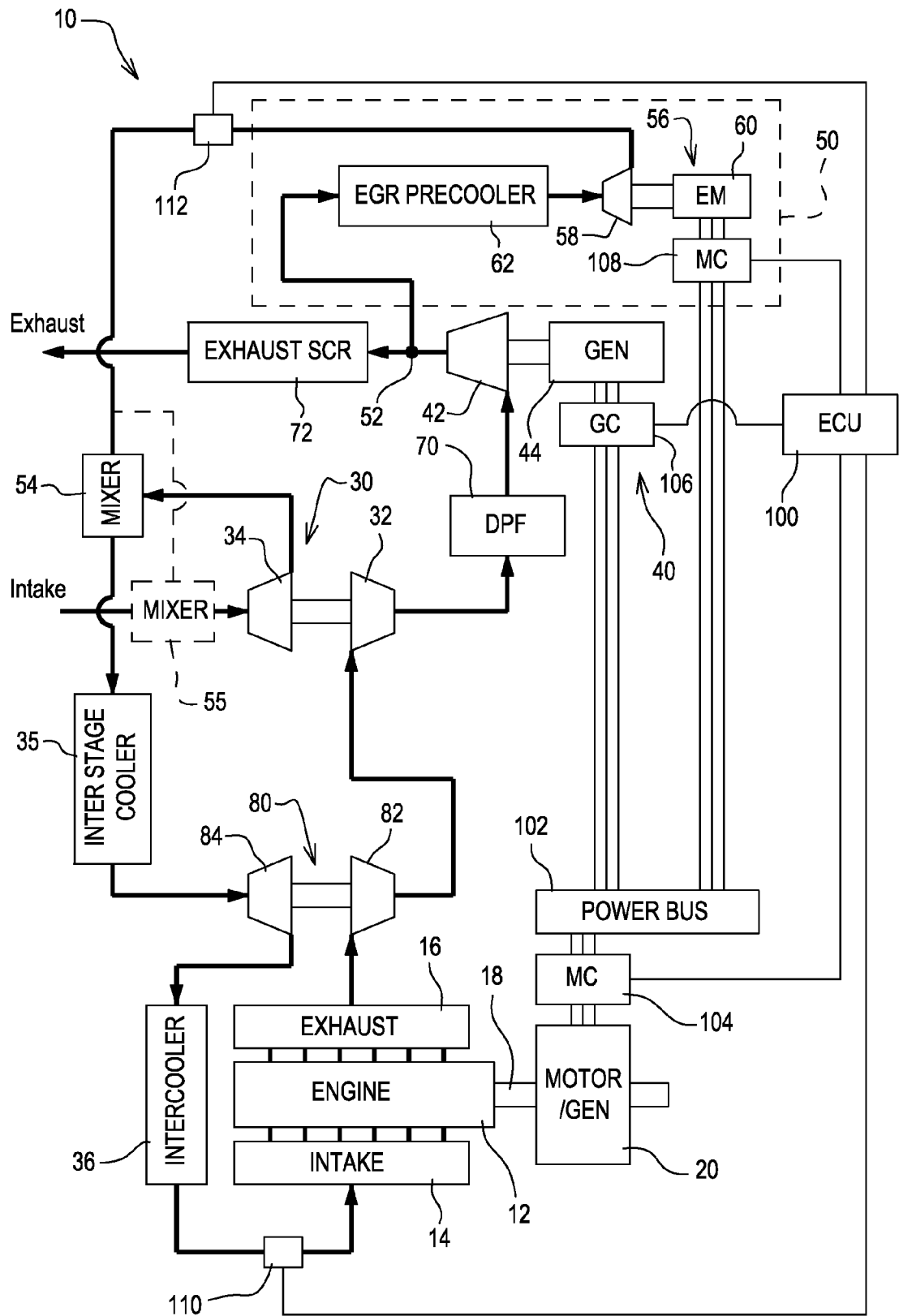

METERING EXHAUST GAS RECIRCULATION SYSTEM FOR A DUAL TURBOCHARGED ENGINE HAVING A TURBOGENERATOR SYSTEM

FIELD OF THE INVENTION

The present invention relates to internal combustion engines, and more particularly, to engines with turbogenerator systems.

BACKGROUND OF THE INVENTION

Internal combustion (IC) engines are widely used to provide mechanical power in mobile and stationary applications. It is common for engines to use turbochargers to harness residual energy from the engine exhaust gases with a turbine driving a compressor to boost airflow to the engine. It is also known to use a power-turbine to harness additional mechanical power, or to drive an electrical generator. The later configuration is known as a turbogenerator.

Exhaust emissions from IC engines are increasing regulated by law. In particular, most developed countries regulate emission levels of both Oxides of Nitrogen (NOx) and particulates of unburned hydrocarbons. To control NOx emissions, it is common to recirculate a portion of exhaust gas (EGR) with intake air for combustion in order to reduce combustion temperatures, thereby inhibiting NOx formation. In the future, even lower NOx emissions will be mandated. Increasingly higher EGR rates are one option achieving even lower NOx emission levels, but historically, EGR systems become more complex, more difficult to control, and less efficient with increasing EGR rates. This situation is further amplified when employing typical EGR systems with turbogenerator-equipped IC engines.

Accordingly, a more efficient and controllable EGR system for high EGR rates for use with turbogenerator-equipped IC engines is needed in the art.

SUMMARY OF THE INVENTION

Presented herein is a more efficient and controllable EGR system for use with an IC engine configured with series low-pressure (LP) and high-pressure (HP) turbochargers, and a turbogenerator system. The EGR system features an EGR-pump that draws exhaust gas from an EGR inlet located downstream of the turbogenerator. The EGR-pump controllably delivers a desired amount of exhaust gas to an EGR mixer located between the compressors of the two turbochargers. The engine optionally includes an EGR pre-cooler located between the EGR inlet and the EGR-pump, and an interstage-cooler located between the EGR mixer and the HP turbocharger compressor. The engine also preferably includes an exhaust filter located between the LP turbocharger turbine and the turbogenerator, and a NOx reduction device located downstream of the EGR inlet.

In one form, an electronic control unit (ECU) determines a desired EGR rate from look-up tables for engine speed and load conditions. In this embodiment, the ECU commands the EGR-pump to provide an output calibrated to attain the desired EGR rate in open-loop control. In another form, the engine is provided with an intake air mass flow-rate sensor and an EGR mass flow-rate sensor. In this embodiment, the ECU compares the sensor readings to determine the actual EGR rate and then commands the EGR-pump to adjust output to attain the desired EGR rate from the look-up table in closed-loop control.

With the use of an EGR-pump, the EGR system functions without expensive EGR valves to control EGR flow, precision venturi to meter EGR flow, or complex variable-geometry turbocharging to drive EGR flow. Rather, low-cost fixed-geometry turbochargers with a simple EGR mixer can be used. By locating the filter in the exhaust stream before the turbogenerator, the restriction created by the filter is not multiplied by the pressure ratio of the turbogenerator turbine; this effect is important in optimizing the performance of turbogenerator systems. In this location, the filter is also subject to higher exhaust temperatures which assist in achieving light-off temperatures required for filter regeneration.

By drawing EGR gas into the EGR system downstream of the turbogenerator turbine, both turbochargers and the turbogenerator benefit in performance from receiving full exhaust flow from the engine. Furthermore, by drawing exhaust gas into the EGR system from an EGR inlet located after the filter, the EGR gas is free from particulates that would ordinarily foul EGR system components, therefore the EGR pre-cooler, interstage-cooler, and intercooler can utilize lower-cost materials, and the EGR mixer can be placed at a location upstream of both the interstage-cooler and the intercooler. Finally, by actively controlling the EGR flow-rate via the EGR-pump, desired EGR flow-rates for given engine operating conditions can be achieved more quickly and accurately than with conventional EGR systems.

BRIEF DESCRIPTION OF THE DRAWINGS

FIG. 1 is a schematic illustration of an embodiment of an IC engine including an EGR system of the present invention.

DESCRIPTION OF THE PREFERRED EMBODIMENT

FIG. 1 shows a schematic for an IC engine 10 that will be well understood by one of ordinary skill in the art. In the schematic the engine 10 is shown with an engine block 12 for internal combustion, an intake manifold 14 for supplying air to the engine block 12 for combustion, an exhaust manifold 16 for collecting exhaust gas from the engine block 12 after combustion, and an output shaft 18 for transferring energy from internal combustion to power external loads. The engine block 12 is representative of any type of internal combustion engine, but is preferably for a reciprocating-type engine having one or more combustion chambers. The engine 10 is further provided with an ECU 100 to monitor sensors and command various functions of the engine 10. Inherent in the ECU 100 is functionality to monitor or calculate engine 10 speed and load, and to command engine 10 functions such as increased or decreased combustion timing in response thereto. Although the system illustrated is applicable to almost any type of IC engine, a compression ignition or Diesel engine is preferred in the foregoing embodiment.

The engine 10 is provided with a motor-generator 20 connected to the output shaft 18. The motor-generator 20 is capable of generating electricity from the engine 10 and providing additional power to the output shaft 18 to aid the engine 10 in driving external loads. The motor-generator 20 supplies and receives electrical power from a common power bus 102 which is capable of storing and discharging electrical power on command. The motor-generator is provided with control circuitry 104 to enable control of motor-generator 20 function by the ECU 100.

The engine 10 is illustrated with a low-pressure (LP) turbocharger 30 and a high-pressure (HP) turbocharger 80 arranged in series. The HP turbocharger 80 features a turbine 82 for receiving exhaust gas from the exhaust manifold 16, and a compressor 84 coupled to the HP turbocharger turbine 82 for delivering pressurized air to the intake manifold 14 for combustion. The LP turbocharger 30 features a turbine 32 for receiving exhaust gas from the HP turbocharger turbine 82, and a compressor 34 coupled to the LP turbocharger turbine 32 for delivering pressurized air to the HP turbocharger compressor 84 for further pressurization. Both LP and HP turbochargers 30, 80, functions to recover a portion of heat energy from the exhaust gas with their respective turbines 32, 82, to drive their respective compressors 34, 84, and thereby increase the amount of intake air delivered to the engine 10 for combustion. The engine 10 is provided with an interstage-cooler 35 located between the LP and HP turbocharger compressors 34, 84, and an intercooler 36 located between the HP turbocharger compressor 84 and intake manifold 14. Both the interstage-cooler 35 and intercooler 36 function to cool the intake air, making it denser for improved volumetric efficiency.

The engine 10 is also shown with a turbogenerator 40 that features a turbine 42 for receiving exhaust gas from the LP turbocharger turbine 32, and a generator 44 coupled to the turbogenerator turbine 42 for generating electrical power. The turbogenerator 40 functions to recover remaining heat energy from the exhaust gas with the turbogenerator turbine 42 to drive the generator 44 and thereby generate electricity, which is supplied to the power bus 102 for storage and discharge. The turbogenerator 40 preferably includes circuitry 106 that enables control of the turbogenerator turbine 42 speed, thereby enabling control of exhaust gas pressure between the LP turbocharger turbine 32 and the turbogenerator turbine 42.

In order to reduce the formation of NOx during combustion, the engine 10 is provided with an EGR system 50. The EGR system 50 draws exhaust gas from an EGR inlet 52 located downstream of the turbogenerator turbine 42, and supplies exhaust gas to an EGR mixer 54 located between the LP turbocharger compressor 34 and the interstage-cooler 35. Optionally, the EGR mixer 54 may be located upstream of the LP turbocharger compressor 34. The EGR system 50 includes an EGR-pump 56 that features a compressor 58 driven by an electric motor 60. The EGR-pump compressor 58 may be a positive-displacement type compressor capable of delivering physically metered EGR flow-rates, such as a scroll or vane compressor. Alternatively, the EGR-pump compressor 58 may be a radial-type similar to a turbocharger compressor.

The electric motor 60 of the EGR-pump is powered from the power bus 102 and includes control circuitry 108 enabling monitoring and control of EGR-pump compressor 58 speed and/or displacement by the ECU 100, thereby providing for metering of exhaust gas quantities. The EGR system 50 optionally includes an EGR pre-cooler 62 positioned between the EGR inlet 52 and EGR-pump compressor 58. The pre-cooler 62, if provided, cools the recirculated exhaust gas, preferably to between 110 and 130 degrees C., making it denser before it enters the EGR-pump compressor 58, and thereby providing for higher pumping efficiencies and lower EGR-pump 56 component temperatures.

In order to meet mandated emission levels for particulates of unburned hydrocarbons, the engine 10 is further provided with an exhaust filter 70 positioned in the exhaust gas flow between the LP turbocharger turbine 32 and the turbogenerator turbine 42. The exhaust filter 70, preferably Diesel particulate filter (DPF), retains substantially any particulates remaining in the exhaust gas after combustion, thereby further reducing particulate emissions from the engine 10. In order to meet mandated emission levels for NOx, the engine 10 further includes a NOx reduction device 72 positioned downstream of the EGR inlet 52. The NOx reduction device 72, preferably a selective-catalyst reduction (SCR) device, reacts to convert substantially all NOx in the exhaust gas into harmless exhaust emission.

During engine 10 operation, the ECU 100 monitors and controls EGR pump compressor 58 speed and/or displacement for a desired EGR mass-flow rate as a percentage of total air intake flow to the engine 10 (EGR rate). Preferably, the ECU 100 monitors an intake air mass-flow sensor 110 located at a point between the EGR mixer 54 and the intake manifold 14, and an EGR mass-flow sensor 112 located at a point between the EGR-pump compressor 58 and the EGR mixer 54. The mass-flow sensors 110, 112 could be any suitable type, but are envisioned to be calibrated hot-wire anemometers. Desired EGR rates are determined by the ECU 100 based on look-up tables for a given engine 10 speed and load.

In open loop operation, the ECU 100 periodically queries engine 10 speed and load measurements inherent in ECU 100 functionality, and then determines the desired EGR rates based on look-up tables for instantaneous speed and load conditions. The ECU 100 then commands the EGR-pump 56 to operate the EGR-pump compressor 58 at a speed and/or displacement calibrated to provide the desired EGR rate, based on assumed or estimated total intake airflow for the instantaneous conditions and known characteristics for the engine 10. In this open-loop control configuration, a positive-displacement EGR-pump compressor 58 is preferred for its ability to physically meter EGR gas by volume.

In closed loop operation, the ECU 100 also periodically queries engine 10 speed and load measurements inherent in ECU 100 functionality, and determines the desired EGR rate based on look-up tables for speed and load conditions. The ECU 100 then calculates the actual EGR rate by comparing EGR mass-flow sensor 112 and intake air mass-flow sensor 112 measurements. If the actual EGR rate is less than the desired EGR rate, then the ECU 100 commands the EGR-pump 56 to operate the EGR-pump compressor 58 at an increased speed and/or displacement in proportion to the difference between the actual and desired rates. If the actual EGR rate is greater than the desired rate, then the ECU 100 commands the EGR-pump 56 to operate the EGR-pump compressor 58 at a decreased speed and/or displacement in proportion to the difference in the rates. In this closed-loop control configuration, a radial-type EGR-pump compressor 58 is preferred for lower cost.

Having described the preferred embodiment, it will become apparent that various modifications can be made without departing from the scope of the invention as defined in the accompanying claims.

The invention claimed is:

1. An internal combustion engine comprising:
an engine block for internal combustion;
a high-pressure (HP) turbocharger having a turbine and a compressor each in communication with the engine block, the turbine being configured for receiving exhaust gas from the engine block, and the compressor being configured for delivering intake air to the engine block;
a low-pressure (LP) turbocharger having a turbine and a compressor each in communication with the HP turbocharger, the turbine being configured for receiving exhaust gas from the HP turbocharger turbine, and the compressor being configured for delivering intake air to the HP turbocharger compressor;
a turbogenerator in communication with the LP turbocharger, the turbogenerator configured for receiving exhaust gas from the LP turbocharger turbine and recovering heat energy from the exhaust gas to generate electricity;

an exhaust gas recirculation (EGR) system having an EGR-pump, EGR inlet located downstream from the turbogenerator, and an EGR mixer located between the LP turbocharger compressor and the HP turbocharger compressor, the EGR-pump being configured for drawing exhaust gas from the EGR inlet and controllably delivering exhaust gas to the EGR; and an electronic control unit (ECU) coupled with the EGR-pump and adapted to command the EGR-pump to deliver a desired EGR rate to the engine block.

2. The internal combustion engine of claim 1 further comprising an exhaust filter located between the LP turbocharger turbine and the turbogenerator, and a NOx reduction device located downstream of the EGR inlet.

3. The internal combustion engine of claim 1 or 2 further comprising an interstage-cooler located between the EGR mixer and the HP turbocharger compressor, and an intercooler located between the HP turbocharger compressor and the engine block.

4. The internal combustion engine of claim 3 further comprising a power bus coupled to the turbogenerator and the EGR-pump, the power bus configured for receiving and storing electrical energy from the turbogenerator and supplying electrical energy to power the EGR-pump.

5. The internal combustion engine of claim 4 further comprising a motor-generator coupled to the engine being configured to controllably generate electricity from engine output for storage on the power bus, and controllably provide additional power drawn from the power bus to aid the engine in powering external loads.

6. The internal combustion engine of claim 4 further comprising an intake air mass flow-rate sensor, and an EGR mass flow-rate sensor, wherein the ECU is adapted to compare said sensor readings to determine an actual EGR rate, to compare the actual EGR rate to the desired EGR rate, and command the EGR-pump to adjust output to attain the desired EGR rate.

7. An internal combustion engine comprising:

an engine block for internal combustion;

a high-pressure (HP) turbocharger having a turbine and a compressor each in communication with the engine block, the turbine being configured for receiving exhaust gas from the engine block, and the compressor being configured for delivering intake air to the engine block;

a low-pressure (LP) turbocharger having a turbine and a compressor each in communication with the HP turbocharger, the turbine being configured for receiving exhaust gas from the HP turbocharger turbine, and the compressor being configured for delivering intake air to the HP turbocharger compressor;

a turbogenerator in communication with the LP turbocharger, the turbogenerator configured for receiving exhaust gas from the LP turbocharger turbine and recovering heat energy from the exhaust gas to generate electricity;

an exhaust gas recirculation (EGR) system having an EGR-pump, an EGR inlet located downstream from the turbogenerator, and an EGR mixer located between the LP turbocharger compressor and the HP turbocharger compressor, the EGR-pump being configured for drawing exhaust gas from the EGR inlet and controllably delivering exhaust gas to the EGR mixer;

an exhaust filter located between the LP turbocharger turbine and the turbogenerator;

a NOx reduction device located downstream of the EGR inlet; and a electronic control unit (ECU) coupled with the EGR-pump and adapted to command the EGR-pump to deliver a desired EGR rate to the engine.

8. The internal combustion engine of claim 7 further comprising an interstage-cooler located between the EGR mixer and the HP turbocharger compressor, and an intercooler located between the HP turbocharger compressor and the engine block.

9. The internal combustion engine of claim 8 further comprising a power bus coupled to the turbogenerator and the EGR-pump, the power bus configured for receiving and storing electrical energy from the turbogenerator and supplying electrical energy to power the EGR-pump.

10. The internal combustion engine of claim 9 further comprising a motor-generator coupled to the engine being configured to controllably generate electricity from engine output for storage on the power bus, and controllably provide additional power drawn from the power bus to aid the engine in powering external loads.

11. The internal combustion engine of claim 7, 8, or 9 further comprising an intake air mass flow-rate sensor, and an EGR mass flow-rate sensor, wherein the ECU is adapted to compare said sensor readings to determine an actual EGR rate, compare the actual EGR rate to the desired EGR rate, and command the EGR-pump to adjust output to attain the desired EGR rate.

* * * * *